(12) United States Patent
Andersen (10) Patent No.: US 9,395,170 B2
(45) Date of Patent: Jul. 19, 2016

(54) ADJUSTABLE RADIUS GAUGE (71) Applicant: John I. Andersen, Idaho Falls, ID (US)

(72) Inventor: John I. Andersen, Idaho Falls, ID (US)

( * ) Notice: Subject to any disclaimer, the term of this patent is extended or adjusted under 35 U.S.C. 154(b) by 66 days.

(21) Appl. No.: 14/539,941

(22) Filed: Nov. 12, 2014

(65) Prior Publication Data

US 2016/0131471 A1    May 12, 2016

(51) Int. Cl.
*G01B 3/10* (2006.01)
*G01B 5/213* (2006.01)

(52) U.S. Cl.
CPC ..................... *G01B 5/213* (2013.01)

(58) Field of Classification Search
CPC ............ G01B 5/08; G01B 5/025; G01B 5/12; G01B 5/20; G01B 5/213
USPC .................... 33/555.1, 555.4, 679.1
See application file for complete search history.

(56) References Cited

U.S. PATENT DOCUMENTS

| | | | | |
|---|---|---|---|---|
| 3,919,776 A * | 11/1975 | Upton | ...................... | G01B 3/56 33/1 N |
| 3,977,468 A * | 8/1976 | Brewer | ............... | E21B 17/1021 166/241.5 |
| 4,989,337 A * | 2/1991 | Mason | ................... | A61B 5/107 33/511 |
| 5,398,419 A * | 3/1995 | Schmidt, Jr. | ......... | G01B 5/0025 33/203 |
| 7,165,337 B1 * | 1/2007 | Fetters | ................... | G01B 5/255 33/203.18 |
| 2002/0162240 A1 * | 11/2002 | Lechen | ..................... | G01B 7/13 33/544 |
| 2005/0060900 A1 * | 3/2005 | Maegli | .................. | G04B 49/04 33/270 |
| 2006/0042109 A1 * | 3/2006 | Kanai | ...................... | G01B 7/12 33/555.1 |
| 2008/0184580 A1 * | 8/2008 | Secq | ........................ | G01B 5/30 33/555 |
| 2011/0061252 A1 * | 3/2011 | Cerwin | .................... | B25H 7/02 33/414 |
| 2012/0240420 A1 * | 9/2012 | Mo | ......................... | G01B 11/24 33/507 |
| 2014/0196301 A1 * | 7/2014 | Towns | ..................... | A43D 1/02 33/769 |
| 2014/0360037 A1 * | 12/2014 | DeLucia | .................. | G01B 7/12 33/555.4 |

OTHER PUBLICATIONS

Baileigh Indus., Inside Radius Gauge IRG-3600, available at http://metal.baileighindustrial.com/inside-radius-gauge-irg-3600 (last accessed Oct. 24, 2014).
Baileigh Indus., Outside Radius Gauge ORG-3600, available at http://metal.baileighindustrial.com/outside-radius-gauge-org-3600 (last accessed Oct. 24, 2014).

* cited by examiner

*Primary Examiner* — G. Bradley Bennett
(74) *Attorney, Agent, or Firm* — Jeffrey Parry Intellectual Property Law Group PLLC; Jeffrey C. Parry (57) ABSTRACT

An adjustable radius gauge for measuring and or checking the radius of parts previously made or while forming radii in the process of being formed, as experienced in the bending in a press brake or rolls, dishing presses, spinning, bulging or shrinking machines or by hand or by whatever process of bending or contouring may be used. Also as a layout tool to layout materials in any trade requiring radius layout and required marking.

10 Claims, 10 Drawing Sheets

| 12" Arc Length | | |
|---|---|---|
| Radius (in) | Cord Length (in) | |
| 4 | 7.98 | 7 31/32 |
| 4 1/4 | 8.39 | 8 13/32 |
| 4 1/2 | 8.75 | 8 3/4 |
| 4 3/4 | 9.05 | 9 1/16 |
| 5 | 9.32 | 9 5/16 |
| 5 1/4 | 9.55 | 9 9/16 |
| 5 1/2 | 9.76 | 9 3/4 |
| 5 3/4 | 9.94 | 9 15/16 |
| 6 | 10.10 | 10 3/32 |
| 6 1/4 | 10.24 | 10 1/4 |
| 6 1/2 | 10.37 | 10 3/8 |
| 6 3/4 | 10.48 | 10 15/32 |
| 7 | 10.58 | 10 19/32 |
| 7 1/4 | 10.68 | 10 11/16 |
| 7 1/2 | 10.76 | 10 3/4 |
| 7 3/4 | 10.84 | 10 27/32 |
| 8 | 10.91 | 10 29/32 |
| 8 1/4 | 10.97 | 10 31/32 |
| 8 1/2 | 11.03 | 11 1/32 |
| 8 3/4 | 11.08 | 11 3/32 |
| 9 | 11.13 | 11 1/8 |
| 9 1/4 | 11.18 | 11 3/16 |
| 9 1/2 | 11.22 | 11 7/32 |
| 9 3/4 | 11.26 | 11 1/4 |
| 10 | 11.29 | 11 9/32 |
| 10 1/4 | 11.33 | 11 5/16 |
| 10 1/2 | 11.36 | 11 11/32 |
| 10 3/4 | 11.39 | 11 3/8 |
| 11 | 11.41 | 11 13/32 |
| 11 1/2 | 11.46 | 11 15/32 |
| 12 | 11.51 | 11 1/2 |
| 12 1/2 | 11.54 | 11 17/32 |
| 13 | 11.58 | 11 19/32 |
| 14 | 11.64 | 11 5/8 |
| 15 | 11.68 | 11 11/16 |
| 16 | 11.72 | 11 23/32 |
| 17 | 11.75 | 11 3/4 |

FIG. 4

| 18" Arc Length ||
|---|---|
| Radius (in) | Cord Length (in) ||
| 6 | 11.97 | 11 31/32 |
| 6 1/4 | 12.39 | 12 13/32 |
| 6 1/2 | 12.78 | 12 25/32 |
| 6 3/4 | 13.12 | 13 1/8 |
| 7 | 13.43 | 13 7/16 |
| 7 1/4 | 13.72 | 13 23/32 |
| 7 1/2 | 13.98 | 13 31/32 |
| 7 3/4 | 14.22 | 14 7/32 |
| 8 | 14.44 | 14 7/16 |
| 8 1/4 | 14.64 | 14 5/8 |
| 8 1/2 | 14.82 | 14 13/16 |
| 8 3/4 | 14.99 | 15 |
| 9 | 15.15 | 15 5/32 |
| 9 1/4 | 15.29 | 15 9/32 |
| 9 1/2 | 15.43 | 15 7/16 |
| 9 3/4 | 15.55 | 15 9/16 |
| 10 | 15.67 | 15 21/32 |
| 10 1/4 | 15.77 | 15 25/32 |
| 10 1/2 | 15.88 | 15 7/8 |
| 10 3/4 | 15.97 | 15 31/32 |
| 11 | 16.06 | 16 1/16 |
| 11 1/4 | 16.14 | 16 1/8 |
| 11 1/2 | 16.22 | 16 7/32 |
| 11 3/4 | 16.29 | 16 9/32 |
| 12 | 16.36 | 16 11/32 |
| 12 1/4 | 16.42 | 16 7/16 |
| 12 1/2 | 16.48 | 16 1/2 |
| 12 3/4 | 16.54 | 16 17/32 |
| 13 | 16.60 | 16 19/32 |
| 13 1/4 | 16.65 | 16 21/32 |
| 13 1/2 | 16.70 | 16 11/16 |
| 13 3/4 | 16.74 | 16 3/4 |
| 14 | 16.79 | 16 25/32 |
| 14 1/4 | 16.83 | 16 13/16 |
| 14 1/2 | 16.87 | 16 7/8 |
| 14 3/4 | 16.90 | 16 29/32 |
| 15 | 16.94 | 16 15/16 |
| 15 1/4 | 16.97 | 16 31/32 |
| 15 1/2 | 17.01 | 17 |
| 15 3/4 | 17.04 | 17 1/32 |

| 18" Arc Length ||
|---|---|
| Radius (in) | Cord Length (in) ||
| 16 | 17.07 | 17 1/16 |
| 16 1/2 | 17.12 | 17 1/8 |
| 17 | 17.17 | 17 5/32 |
| 17 1/2 | 17.22 | 17 7/32 |
| 18 | 17.26 | 17 1/4 |
| 18 1/2 | 17.30 | 17 5/16 |
| 19 | 17.33 | 17 11/32 |
| 19 1/2 | 17.37 | 17 3/8 |
| 20 | 17.40 | 17 13/32 |
| 20 1/2 | 17.43 | 17 7/16 |
| 21 | 17.45 | 17 15/32 |
| 23 | 17.54 | 17 17/32 |
| 25 | 17.61 | 17 5/8 |
| 29 | 17.71 | 17 23/32 |

FIG. 5

| 24" Arc Length | | |
|---|---|---|
| Radius (in) | Cord Length (in) | |
| 8 | 15.96 | 15 31/32 |
| 8 1/4 | 16.39 | 16 3/8 |
| 8 1/2 | 16.79 | 16 25/32 |
| 8 3/4 | 17.15 | 17 5/32 |
| 9 | 17.49 | 17 1/2 |
| 9 1/4 | 17.81 | 17 13/16 |
| 9 1/2 | 18.11 | 18 3/32 |
| 9 3/4 | 18.38 | 18 3/8 |
| 10 | 18.64 | 18 21/32 |
| 10 1/4 | 18.88 | 18 7/8 |
| 10 1/2 | 19.11 | 19 3/32 |
| 10 3/4 | 19.32 | 19 5/16 |
| 11 | 19.52 | 19 1/2 |
| 11 1/4 | 19.70 | 19 11/16 |
| 11 1/2 | 19.88 | 19 7/8 |
| 11 3/4 | 20.04 | 20 1/32 |
| 12 | 20.20 | 20 3/16 |
| 12 1/4 | 20.34 | 20 11/32 |
| 12 1/2 | 20.48 | 20 15/32 |
| 12 3/4 | 20.61 | 20 5/8 |
| 13 | 20.73 | 20 23/32 |
| 13 1/4 | 20.85 | 20 27/32 |
| 13 1/2 | 20.96 | 20 31/32 |
| 13 3/4 | 21.07 | 21 1/16 |
| 14 | 21.17 | 21 5/32 |
| 14 1/4 | 21.26 | 21 1/4 |
| 14 1/2 | 21.35 | 21 11/32 |
| 14 3/4 | 21.44 | 21 7/16 |
| 15 | 21.52 | 21 17/32 |
| 15 1/4 | 21.60 | 21 19/32 |
| 15 1/2 | 21.67 | 21 11/16 |
| 15 3/4 | 21.74 | 21 3/4 |
| 16 | 21.81 | 21 13/16 |
| 16 1/4 | 21.88 | 21 7/8 |
| 16 1/2 | 21.94 | 21 15/16 |
| 16 3/4 | 22.00 | 22 |
| 17 | 22.06 | 22 1/16 |
| 17 1/4 | 22.11 | 22 1/8 |
| 17 1/2 | 22.16 | 22 5/32 |
| 17 3/4 | 22.21 | 22 7/32 |

| 24" Arc Length | | |
|---|---|---|
| Radius (in) | Cord Length (in) | |
| 18 | 22.26 | 22 1/4 |
| 18 1/4 | 22.31 | 22 5/16 |
| 18 1/2 | 22.35 | 22 11/32 |
| 18 3/4 | 22.39 | 22 13/32 |
| 19 | 22.44 | 22 7/16 |
| 19 1/4 | 22.48 | 22 15/32 |
| 19 1/2 | 22.51 | 22 1/2 |
| 19 3/4 | 22.55 | 22 9/16 |
| 20 | 22.59 | 22 19/32 |
| 20 1/4 | 22.62 | 22 5/8 |
| 20 1/2 | 22.65 | 22 21/32 |
| 20 3/4 | 22.68 | 22 11/16 |
| 21 | 22.72 | 22 23/32 |
| 21 1/2 | 22.77 | 22 25/32 |
| 22 | 22.83 | 22 13/16 |
| 22 1/2 | 22.88 | 22 7/8 |
| 23 | 22.93 | 22 15/16 |
| 23 1/2 | 22.97 | 22 31/32 |
| 24 | 23.01 | 23 |
| 24 1/2 | 23.05 | 23 1/16 |
| 25 | 23.09 | 23 3/32 |
| 25 1/2 | 23.12 | 23 1/8 |
| 26 | 23.16 | 23 5/32 |
| 26 1/2 | 23.19 | 23 3/16 |
| 27 | 23.22 | 23 7/32 |
| 27 1/2 | 23.25 | 23 1/4 |
| 28 | 23.27 | 23 9/32 |
| 30 | 23.37 | 23 3/8 |
| 32 | 23.44 | 23 7/16 |
| 34 | 23.50 | 23 1/2 |
| 36 | 23.56 | 23 9/16 |
| 38 | 23.60 | 23 19/32 |
| 40 | 23.64 | 23 21/32 |
| 42 | 23.67 | 23 11/16 |
| 44 | 23.70 | 23 23/32 |
| 48 | 23.75 | 23 3/4 |

FIG. 6

| 36" Arc Length ||
|---|---|
| Radius (in) | Cord Length (in) |
| 12 | 23.94 | 23 15/16 |
| 12 1/4 | 24.37 | 24 3/8 |
| 12 1/2 | 24.79 | 24 25/32 |
| 12 3/4 | 25.18 | 25 3/16 |
| 13 | 25.55 | 25 9/16 |
| 13 1/4 | 25.91 | 25 29/32 |
| 13 1/2 | 26.24 | 26 1/4 |
| 13 3/4 | 26.56 | 26 9/16 |
| 14 | 26.87 | 26 7/8 |
| 14 1/4 | 27.16 | 27 5/32 |
| 14 1/2 | 27.44 | 27 7/16 |
| 14 3/4 | 27.71 | 27 23/32 |
| 15 | 27.96 | 27 31/32 |
| 15 1/4 | 28.20 | 28 7/32 |
| 15 1/2 | 28.44 | 28 7/16 |
| 15 3/4 | 28.66 | 28 21/32 |
| 16 | 28.87 | 28 7/8 |
| 16 1/4 | 29.08 | 29 1/16 |
| 16 1/2 | 29.27 | 29 9/32 |
| 16 3/4 | 29.46 | 29 15/32 |
| 17 | 29.64 | 29 5/8 |
| 17 1/4 | 29.81 | 29 13/16 |
| 17 1/2 | 29.98 | 29 31/32 |
| 17 3/4 | 30.14 | 30 1/8 |
| 18 | 30.29 | 30 9/32 |
| 18 1/4 | 30.44 | 30 7/16 |
| 18 1/2 | 30.58 | 30 19/32 |
| 18 3/4 | 30.72 | 30 23/32 |
| 19 | 30.85 | 30 27/32 |
| 19 1/4 | 30.98 | 30 31/32 |
| 19 1/2 | 31.10 | 31 3/32 |
| 19 3/4 | 31.22 | 31 7/32 |
| 20 | 31.33 | 31 11/32 |
| 20 1/4 | 31.44 | 31 7/16 |
| 20 1/2 | 31.55 | 31 9/16 |
| 20 3/4 | 31.65 | 31 21/32 |
| 21 | 31.75 | 31 3/4 |
| 21 1/4 | 31.85 | 31 27/32 |
| 21 1/2 | 31.94 | 31 15/16 |
| 21 3/4 | 32.03 | 32 1/32 |

| 36" Arc Length ||
|---|---|
| Radius (in) | Cord Length (in) |
| 22 | 32.12 | 32 1/8 |
| 22 1/4 | 32.20 | 32 3/16 |
| 22 1/2 | 32.28 | 32 9/32 |
| 22 3/4 | 32.36 | 32 3/8 |
| 23 | 32.44 | 32 7/16 |
| 23 1/4 | 32.51 | 32 1/2 |
| 23 1/2 | 32.58 | 32 19/32 |
| 23 3/4 | 32.65 | 32 21/32 |
| 24 | 32.72 | 32 23/32 |
| 24 1/4 | 32.78 | 32 25/32 |
| 24 1/2 | 32.85 | 32 27/32 |
| 24 3/4 | 32.91 | 32 29/32 |
| 25 | 32.97 | 32 31/32 |
| 25 1/4 | 33.03 | 33 1/32 |
| 25 1/2 | 33.08 | 33 3/32 |
| 25 3/4 | 33.14 | 33 1/8 |
| 26 | 33.19 | 33 3/16 |
| 26 1/4 | 33.24 | 33 1/4 |
| 26 1/2 | 33.29 | 33 9/32 |
| 26 3/4 | 33.34 | 33 11/32 |
| 27 | 33.39 | 33 13/32 |
| 27 1/4 | 33.44 | 33 7/16 |
| 27 1/2 | 33.48 | 33 15/32 |
| 27 3/4 | 33.53 | 33 17/32 |
| 28 | 33.57 | 33 9/16 |
| 28 1/4 | 33.61 | 33 5/8 |
| 28 1/2 | 33.65 | 33 21/32 |
| 28 3/4 | 33.69 | 33 11/16 |
| 29 | 33.73 | 33 23/32 |
| 29 1/4 | 33.77 | 33 25/32 |
| 29 1/2 | 33.81 | 33 13/16 |
| 29 3/4 | 33.84 | 33 27/32 |
| 30 | 33.88 | 33 7/8 |
| 30 1/4 | 33.91 | 33 29/32 |
| 30 1/2 | 33.95 | 33 15/16 |
| 30 3/4 | 33.98 | 33 31/32 |
| 31 | 34.01 | 34 |
| 31 1/4 | 34.04 | 34 1/32 |
| 31 1/2 | 34.07 | 34 1/16 |
| 31 3/4 | 34.10 | 34 3/32 |

FIG. 7A

| 36" Arc Length | | |
|---|---|---|
| Radius (in) | Cord Length (in) | |
| 32 | 34.13 | 34 1/8 |
| 32 1/4 | 34.16 | 34 5/32 |
| 32 1/2 | 34.19 | 34 3/16 |
| 32 3/4 | 34.21 | 34 7/32 |
| 33 | 34.24 | 34 1/4 |
| 33 1/2 | 34.29 | 34 9/32 |
| 34 | 34.34 | 34 11/32 |
| 34 1/2 | 34.39 | 34 3/8 |
| 35 | 34.43 | 34 7/16 |
| 35 1/2 | 34.48 | 34 15/32 |
| 36 | 34.52 | 34 17/32 |
| 36 1/2 | 34.56 | 34 9/16 |
| 37 | 34.60 | 34 19/32 |
| 37 1/2 | 34.63 | 34 5/8 |
| 38 | 34.67 | 34 21/32 |
| 38 1/2 | 34.70 | 34 11/16 |
| 39 | 34.74 | 34 3/4 |
| 39 1/2 | 34.77 | 34 25/32 |
| 40 | 34.80 | 34 13/16 |
| 42 | 34.91 | 34 29/32 |
| 44 | 35.00 | 35 |
| 46 | 35.09 | 35 3/32 |
| 48 | 35.16 | 35 5/32 |
| 50 | 35.23 | 35 7/32 |
| 52 | 35.29 | 35 9/32 |
| 54 | 35.34 | 35 11/32 |
| 56 | 35.38 | 35 3/8 |
| 58 | 35.42 | 35 7/16 |
| 60 | 35.46 | 35 15/32 |
| 62 | 35.50 | 35 1/2 |
| 64 | 35.53 | 35 17/32 |
| 66 | 35.56 | 35 9/16 |
| 68 | 35.58 | 35 19/32 |
| 72 | 35.63 | 35 5/8 |
| 76 | 35.66 | 35 21/32 |
| 80 | 35.70 | 35 11/16 |
| 84 | 35.73 | 35 23/32 |
| 88 | 35.75 | 35 3/4 |

FIG. 7B

| 48" Arc Length | | |
|---|---|---|
| Radius (in) | Cord Length (in) | |
| 16 | 31.92 | 31 29/32 |
| 16 1/4 | 32.36 | 32 11/32 |
| 16 1/2 | 32.78 | 32 25/32 |
| 16 3/4 | 33.18 | 33 3/16 |
| 17 | 33.57 | 33 9/16 |
| 17 1/4 | 33.95 | 33 15/16 |
| 17 1/2 | 34.31 | 34 5/16 |
| 17 3/4 | 34.65 | 34 21/32 |
| 18 | 34.99 | 35 |
| 18 1/4 | 35.31 | 35 5/16 |
| 18 1/2 | 35.62 | 35 5/8 |
| 18 3/4 | 35.93 | 35 15/16 |
| 19 | 36.22 | 36 7/32 |
| 19 1/4 | 36.50 | 36 1/2 |
| 19 1/2 | 36.77 | 36 25/32 |
| 19 3/4 | 37.03 | 37 1/32 |
| 20 | 37.28 | 37 9/32 |
| 20 1/4 | 37.53 | 37 17/32 |
| 20 1/2 | 37.76 | 37 3/4 |
| 20 3/4 | 37.99 | 38 |
| 21 | 38.21 | 38 7/32 |
| 21 1/4 | 38.43 | 38 7/16 |
| 21 1/2 | 38.63 | 38 5/8 |
| 21 3/4 | 38.84 | 38 27/32 |
| 22 | 39.03 | 39 1/32 |
| 22 1/4 | 39.22 | 39 7/32 |
| 22 1/2 | 39.40 | 39 13/32 |
| 22 3/4 | 39.58 | 39 19/32 |
| 23 | 39.75 | 39 3/4 |
| 23 1/4 | 39.92 | 39 29/32 |
| 23 1/2 | 40.08 | 40 3/32 |
| 23 3/4 | 40.24 | 40 1/4 |
| 24 | 40.39 | 40 3/8 |
| 24 1/4 | 40.54 | 40 17/32 |
| 24 1/2 | 40.68 | 40 11/16 |
| 24 3/4 | 40.82 | 40 13/16 |
| 25 | 40.96 | 40 31/32 |
| 25 1/4 | 41.09 | 41 3/32 |
| 25 1/2 | 41.22 | 41 7/32 |
| 25 3/4 | 41.35 | 41 11/32 |

| 48" Arc Length | | |
|---|---|---|
| Radius (in) | Cord Length (in) | |
| 26 | 41.47 | 41 15/32 |
| 26 1/4 | 41.59 | 41 19/32 |
| 26 1/2 | 41.70 | 41 11/16 |
| 26 3/4 | 41.81 | 41 13/16 |
| 27 | 41.92 | 41 15/16 |
| 27 1/4 | 42.03 | 42 1/32 |
| 27 1/2 | 42.13 | 42 1/8 |
| 27 3/4 | 42.24 | 42 1/4 |
| 28 | 42.33 | 42 11/32 |
| 28 1/4 | 42.43 | 42 7/16 |
| 28 1/2 | 42.52 | 42 17/32 |
| 28 3/4 | 42.62 | 42 5/8 |
| 29 | 42.71 | 42 23/32 |
| 29 1/4 | 42.79 | 42 25/32 |
| 29 1/2 | 42.88 | 42 7/8 |
| 29 3/4 | 42.96 | 42 31/32 |
| 30 | 43.04 | 43 1/32 |
| 30 1/4 | 43.12 | 43 1/8 |
| 30 1/2 | 43.20 | 43 3/16 |
| 30 3/4 | 43.27 | 43 9/32 |
| 31 | 43.35 | 43 11/32 |
| 31 1/4 | 43.42 | 43 13/32 |
| 31 1/2 | 43.49 | 43 1/2 |
| 31 3/4 | 43.56 | 43 9/16 |
| 32 | 43.62 | 43 5/8 |
| 32 1/4 | 43.69 | 43 11/16 |
| 32 1/2 | 43.75 | 43 3/4 |
| 32 3/4 | 43.82 | 43 13/16 |
| 33 | 43.88 | 43 7/8 |
| 33 1/4 | 43.94 | 43 15/16 |
| 33 1/2 | 44.00 | 44 |
| 33 3/4 | 44.06 | 44 1/16 |
| 34 | 44.11 | 44 1/8 |
| 34 1/4 | 44.17 | 44 5/32 |
| 34 1/2 | 44.22 | 44 7/32 |
| 34 3/4 | 44.27 | 44 9/32 |
| 35 | 44.33 | 44 5/16 |
| 35 1/4 | 44.38 | 44 3/8 |
| 35 1/2 | 44.43 | 44 7/16 |
| 35 3/4 | 44.47 | 44 15/32 |

FIG. 8A

| 48" Arc Length | | |
|---|---|---|
| Radius (in) | Cord Length (in) | |
| 36 | 44.52 | 44 17/32 |
| 36 1/4 | 44.57 | 44 9/16 |
| 36 1/2 | 44.62 | 44 5/8 |
| 36 3/4 | 44.66 | 44 21/32 |
| 37 | 44.70 | 44 23/32 |
| 37 1/4 | 44.75 | 44 3/4 |
| 37 1/2 | 44.79 | 44 25/32 |
| 37 3/4 | 44.83 | 44 27/32 |
| 38 | 44.87 | 44 7/8 |
| 38 1/4 | 44.91 | 44 29/32 |
| 38 1/2 | 44.95 | 44 15/16 |
| 38 3/4 | 44.99 | 45 |
| 39 | 45.03 | 45 1/32 |
| 39 1/4 | 45.06 | 45 1/16 |
| 39 1/2 | 45.10 | 45 3/32 |
| 39 3/4 | 45.14 | 45 1/8 |
| 40 | 45.17 | 45 5/32 |
| 40 1/4 | 45.21 | 45 7/32 |
| 40 1/2 | 45.24 | 45 1/4 |
| 40 3/4 | 45.27 | 45 9/32 |
| 41 | 45.31 | 45 5/16 |
| 41 1/4 | 45.34 | 45 11/32 |
| 41 1/2 | 45.37 | 45 3/8 |
| 41 3/4 | 45.40 | 45 13/32 |
| 42 | 45.43 | 45 7/16 |
| 42 1/2 | 45.49 | 45 1/2 |
| 43 | 45.55 | 45 17/32 |
| 43 1/2 | 45.60 | 45 19/32 |
| 44 | 45.65 | 45 21/32 |
| 44 1/2 | 45.71 | 45 23/32 |
| 45 | 45.76 | 45 3/4 |
| 45 1/2 | 45.80 | 45 13/16 |
| 46 | 45.85 | 45 27/32 |
| 46 1/2 | 45.90 | 45 29/32 |
| 47 | 45.94 | 45 15/16 |
| 47 1/2 | 45.98 | 45 31/32 |
| 48 | 46.02 | 46 1/32 |
| 48 1/2 | 46.06 | 46 1/16 |
| 49 | 46.10 | 46 3/32 |
| 49 1/2 | 46.14 | 46 5/32 |

| 48" Arc Length | | |
|---|---|---|
| Radius (in) | Cord Length (in) | |
| 50 | 46.18 | 46 3/16 |
| 50 1/2 | 46.21 | 46 7/32 |
| 51 | 46.25 | 46 1/4 |
| 51 1/2 | 46.28 | 46 9/32 |
| 52 | 46.31 | 46 5/16 |
| 52 1/2 | 46.35 | 46 11/32 |
| 53 | 46.38 | 46 3/8 |
| 53 1/2 | 46.41 | 46 13/32 |
| 54 | 46.44 | 46 7/16 |
| 56 | 46.54 | 46 17/32 |
| 58 | 46.64 | 46 21/32 |
| 60 | 46.73 | 46 23/32 |
| 62 | 46.81 | 46 13/16 |
| 64 | 46.88 | 46 7/8 |
| 66 | 46.95 | 46 15/16 |
| 68 | 47.01 | 47 |
| 70 | 47.07 | 47 1/16 |
| 72 | 47.12 | 47 1/8 |
| 74 | 47.16 | 47 5/32 |
| 76 | 47.21 | 47 7/32 |
| 78 | 47.25 | 47 1/4 |
| 80 | 47.28 | 47 9/32 |
| 82 | 47.32 | 47 5/16 |
| 84 | 47.35 | 47 11/32 |
| 86 | 47.38 | 47 3/8 |
| 88 | 47.41 | 47 13/32 |
| 90 | 47.43 | 47 7/16 |
| 92 | 47.46 | 47 15/32 |
| 96 | 47.50 | 47 1/2 |
| 100 | 47.54 | 47 17/32 |
| 104 | 47.58 | 47 9/16 |
| 108 | 47.61 | 47 19/32 |
| 112 | 47.63 | 47 5/8 |
| 116 | 47.66 | 47 21/32 |
| 120 | 47.68 | 47 11/16 |
| 126 | 47.71 | 47 23/32 |
| 132 | 47.74 | 47 3/4 |

FIG. 8B

ADJUSTABLE RADIUS GAUGE

BACKGROUND

Over the course of history, radii have been used in innumerable arts and trades. Commonly, fixed contour templates have been and are used in all trades and arts. These templates have been laid out and cut from many forms of material such as card board, light gauge sheet metal, or any semi-rigid or rigid material adequate to hold its shape long enough to produce the desired duplicated part contour. At the end of the production of the desired part, the template is either hung on a peg in the shop, or discarded. The time it takes to make a simple two-dimensional template usually runs into several minutes with the average requiring at least 30 minutes of time. Additionally, each time a template is created, some amount of material is used, which could have been used for other purposes. Generally, these templates are saved for potential future use, but the time it takes to find any one specific template may consume more time than to make a new one. Therefore, they stack up until after hundreds are accumulated, they are all thrown away and the process starts over.

To measure an existing radius, and make a template has been a trial and error process which could be expensive in both time and materials.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

FIG. 6 is a table depicting dimensional radius and chord length data for a 24-inch arc length;

FIG. 7A is part one of a table depicting dimensional radius and chord length data for a 36-inch arc length;

FIG. 8A is part one of a table depicting dimensional radius and chord length data for a 48-inch arc length; and FIG. 8B is part two of a table depicting dimensional radius and chord length data for a 48-inch arc length.

Corresponding reference characters indicate corresponding components throughout the several views of the drawings Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, reference is made to exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples.

Figure 1:
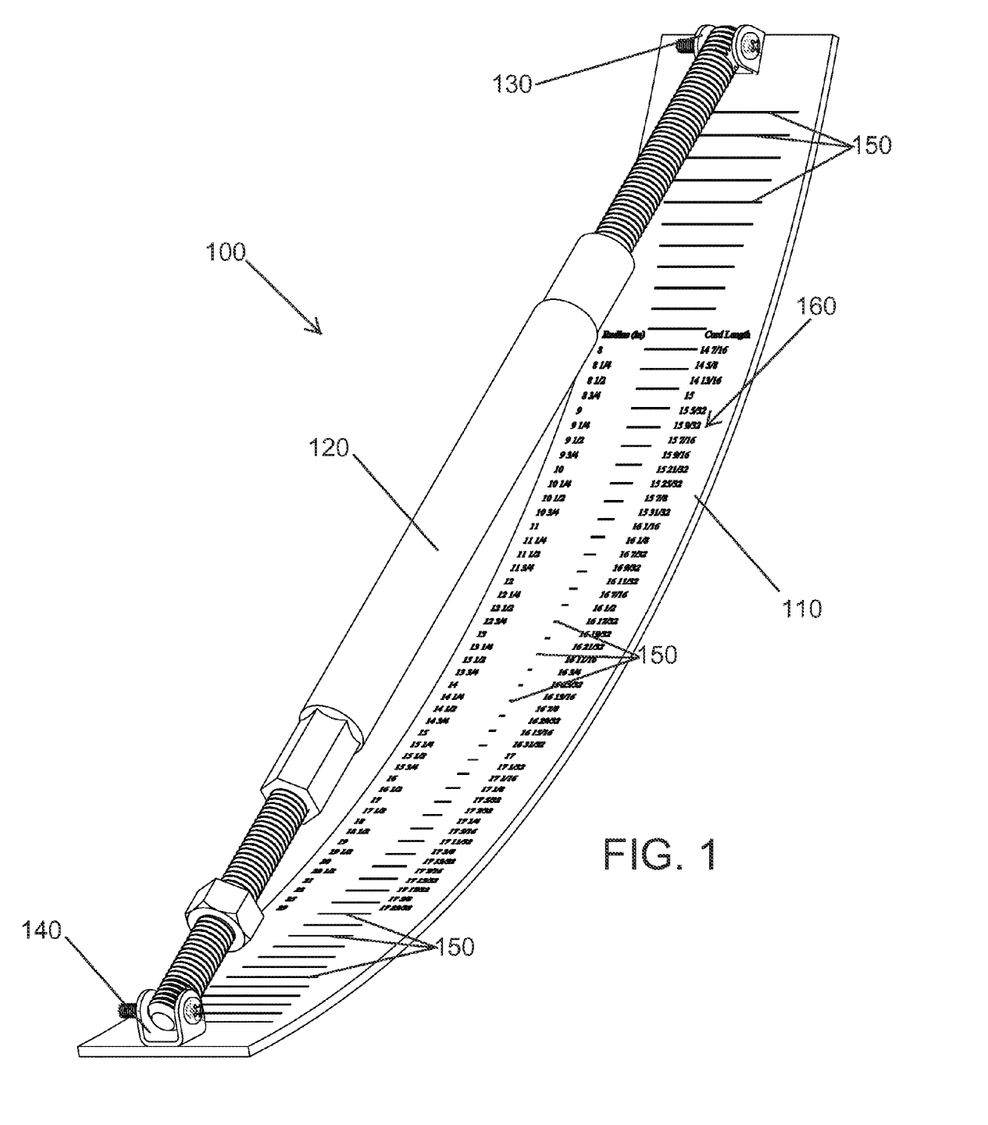
FIG. 1 is a plan view of the flat rectangular spring with the transverse laser or water-jet cut slits in it.
Figure 2:
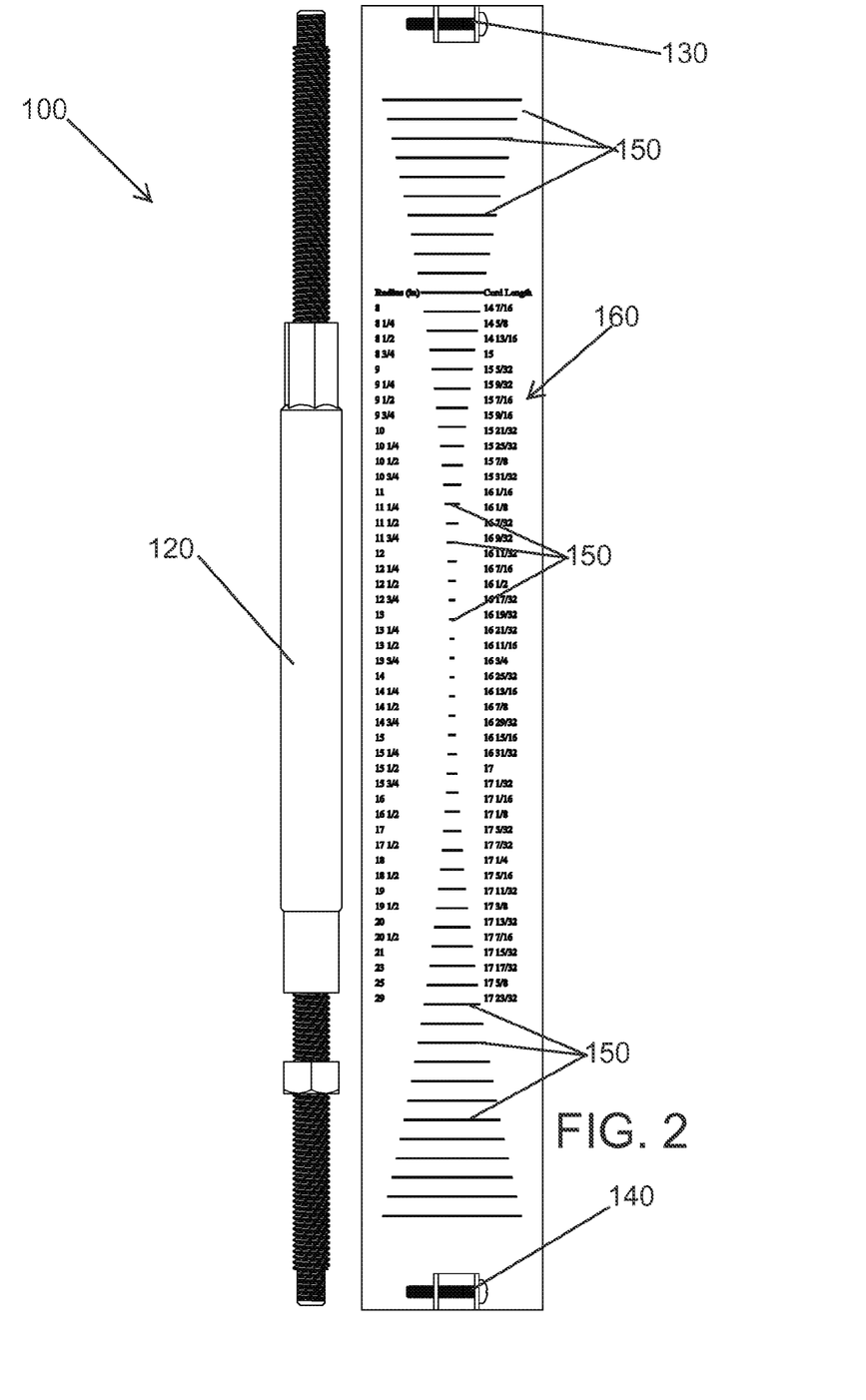
FIG. 2 shows the flat rectangular spring with the shackle brackets on each end to which the turn buckle attaches.
Figure 3:
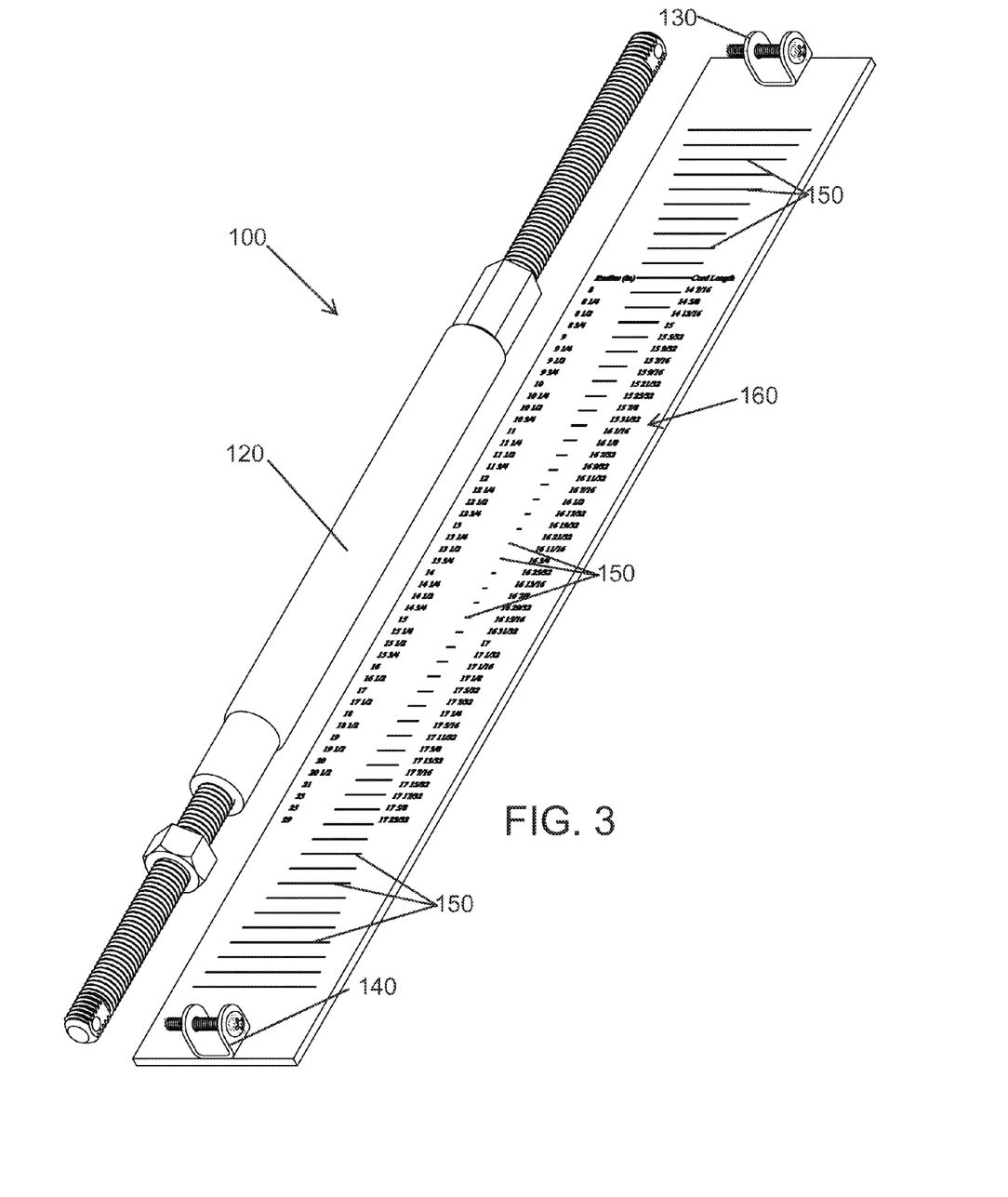
FIG. 3 shows the turn buckle attached to the shackle brackets, permitting the adjustment of the chord length and thereby the change in the arc radius of the flat rectangular spring.

Referring to FIGS. 1, 2, and 3, embodiments of the present disclosure include an adjustable radius gauge 100. According to various embodiments, adjustable radius gauge 100 comprises a flexible flat spring 110 with a turn buckle 120 attached to both ends with small shackle brackets 130, 140 which allows the turn buckle 120 to draw the ends of the flat spring 110 together forming an arc. In some embodiments, the flat spring 100 is thick enough to be relatively rigid but flexible enough to be bent into virtually infinite number of differing radii. In practice, a shop and/or tradesman may have a set of three adjustable radius gauge 100 in varying lengths, making it possible to cover the majority of radii typically produced by any one shop or tradesman. The length of the flat spring 110 is a fixed dimension corresponding to the arc length of the tool 100. The turn buckle 120 corresponds to an adjustable chord length for any given arc radius desired. In one embodiment, flat spring 110 comprises a rectangular shape. In alternative embodiments, flat spring 110 comprises other shapes to fit particular needs or circumstances.

In some embodiments, an adjustment of the turn buckle 120 from any previous setting to any new setting may be accomplished in less than 30 seconds.

In embodiments, the flat spring 110 has numerous transverse slits 150 of varying lengths cut along its length to promote bending in a true radius. In some embodiments, the slits 150 may be created by laser or water-jet cutting. In one embodiment, slits 150 comprise progressively shorter lengths toward the middle of the flexible flat spring 110. In an embodiment, slits 150 comprise parallel lines that are equidistant from each other.

Figure 4:
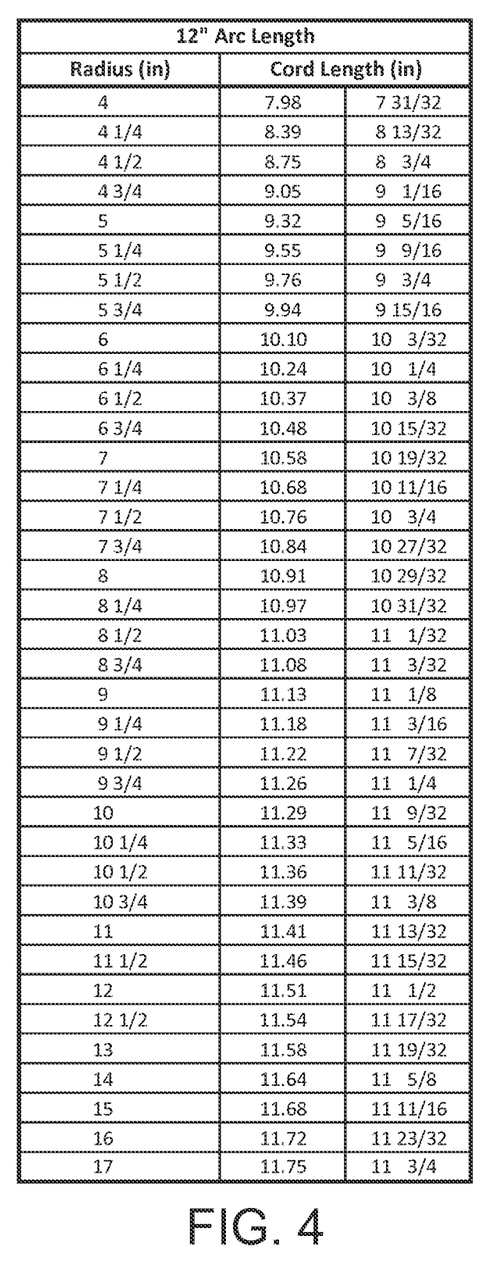
FIG. 4 is a table depicting dimensional radius and chord length data for a 12-inch arc length.
Figure 5:
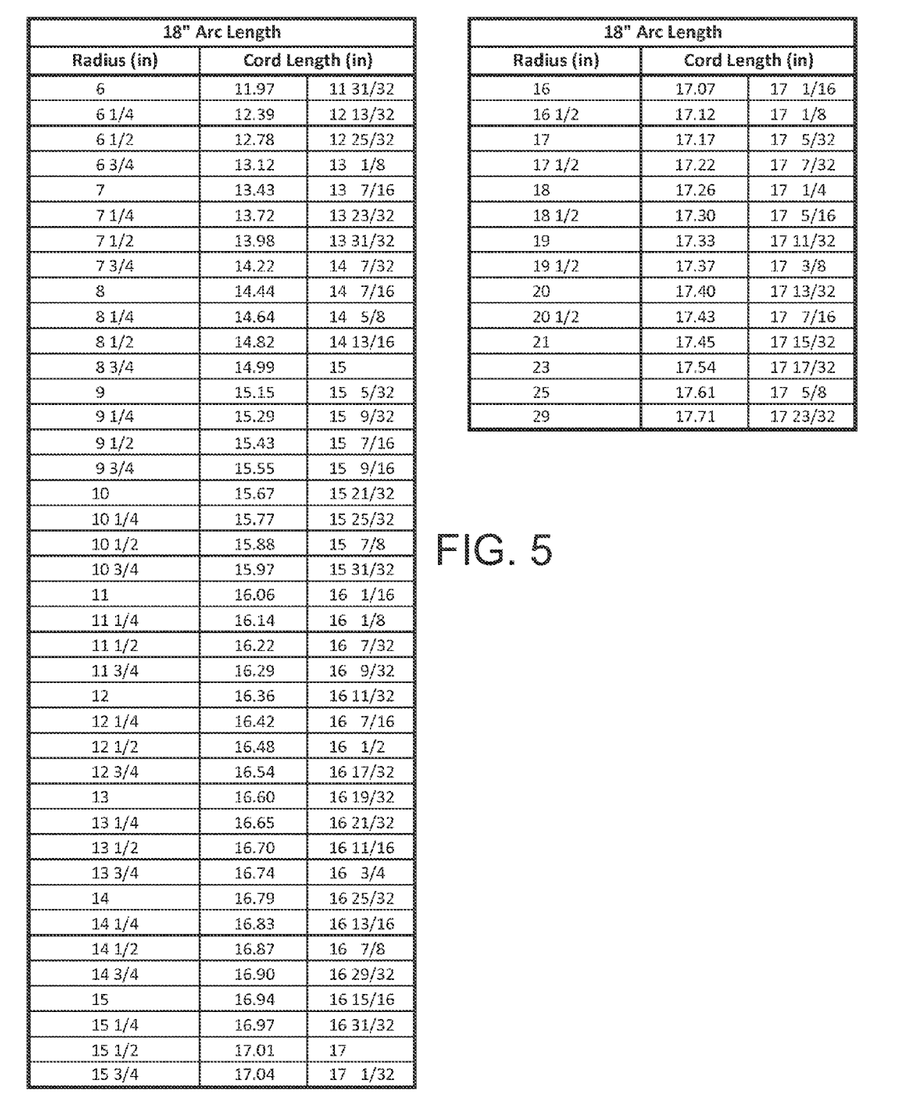
FIG. 5 is a table depicting dimensional radius and chord length data for an 18-inch arc length.
Figure 7B:
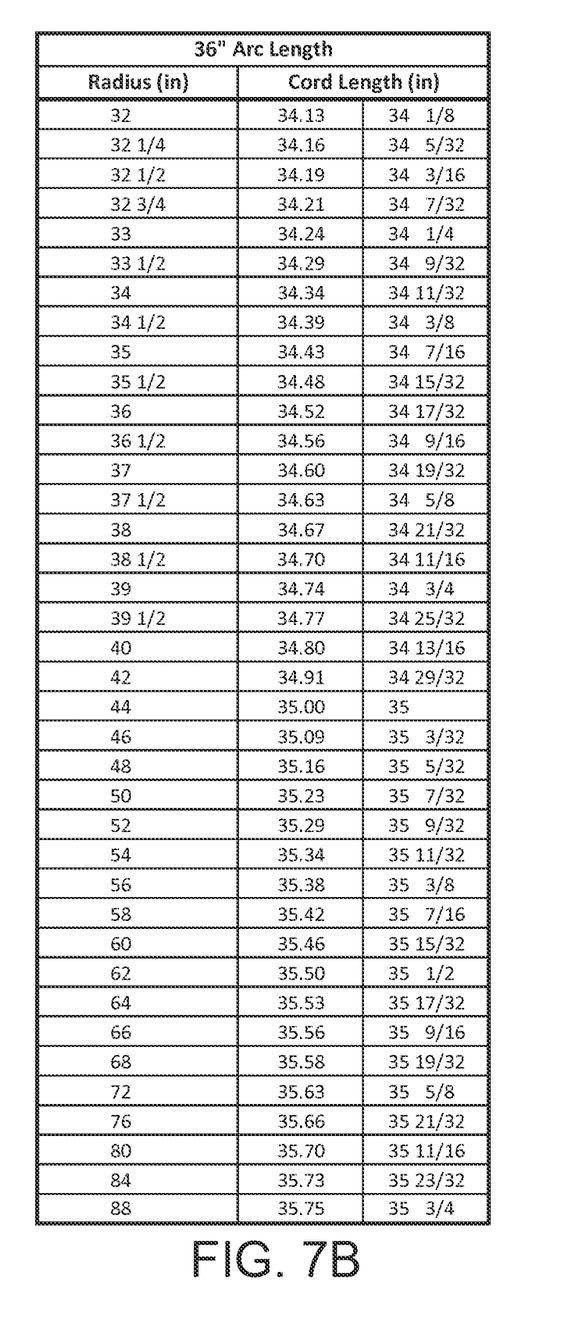
FIG. 7B is part two of a table depicting dimensional radius and chord length data for a 36-inch arc length.

In some embodiments, a table 160 of radii and their related chord lengths is engraved, printed, or otherwise reproduced on a surface of adjustable radius gauge 100, making it convenient and quick to check for one's selected desired radius and turn the turn buckle 120 until the desired chord length has been reached. One may verify if the turn buckle 120 has been set to the desired chord length by simply checking with a standard tape measure or other measurement tool. Examples of table 160, reflecting various arc lengths, are reproduced in FIG. 4 for a 12-inch arc length, FIG. 5 for an 18-inch arc length, FIG. 6 for a 24-inch arc length, FIGS. 7A and 7B for a 36-inch arc length, and FIGS. 8A and 8B for a 48-inch arc length.

When fitting the template to an existing arc that one wants to duplicate, one can simply turn the turn buckle 120 until the flat spring 110 has a curve matching the existing arc. One can then measure the chord length and determine what the radius is by consulting the chart 160.

According to various embodiments, adjustable radius gauge 100 is designed to be quickly adjusted to nearly any radius in a short time and accurately produce a true radius arc along its entire length, allowing pre-bend checking of rolled or bumped steel shapes and the continuous radius as produced in a set of rolls, or in the continuous bumping process in a dishing press or a press brake. Inside radii, outside radii, or both can be checked with this radius gauge 100.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. An adjustable radius gauge comprising a flat spring.
2. The adjustable radius gauge of claim 1, further comprising multiple spaced transverse slits.
3. The adjustable radius gauge of claim 2, wherein the multiple spaced transverse slits are equally spaced.
4. The adjustable radius gauge of claim 2, wherein the multiple spaced slits have variable lengths.
5. The adjustable radius gauge of claim 4, wherein the multiple spaced slits comprise progressively shorter lengths toward the middle of the adjustable radius gauge.
6. The adjustable radius gauge of claim 1, further comprising shackle brackets attached to both ends of the flat spring.
7. The adjustable radius gauge of claim 6, further comprising a turn buckle, both ends of which are attached to the shackle brackets.
8. The adjustable radius gauge of claim 7, wherein the turn buckle is adapted to be adjusted in length, thereby causing the flat spring to deform into an arc.
9. The adjustable radius gauge of claim 1, further comprising:
   a first pivot point on the flat spring;
   a second pivot point on the flat spring; and
   a turn buckle spanning between the first pivot point and the second pivot point.
10. The adjustable radius gauge of claim 1, further comprising numerical data reproduced on a surface of the flat spring, the numerical data comprising a correlation between a radius, an arc length, and a chord length for a curve.

* * * * *